United States Patent [19]

Delaney et al.

[11] Patent Number: 5,164,941
[45] Date of Patent: Nov. 17, 1992

[54] SYSTEM FOR IMPLEMENTING IMPROVED ATTEMPT-AND-DEFER ACCESS CONTENTION PROTOCOL

[75] Inventors: David M. Delaney, Ottawa; David Schenkel, Nepean; David Milton, Kanata, all of Canada

[73] Assignee: Canai Computer and Network Architecture Inc., Stittsville, Canada

[21] Appl. No.: 469,321

[22] Filed: Jan. 24, 1990

[51] Int. Cl.⁵ .......................... H04J 3/14; H04J 3/24; H04J 3/08
[52] U.S. Cl. .................................. 370/85.3; 370/94.1
[58] Field of Search ............... 370/85.2, 85.3, 85.1, 370/94.1; 340/825.61

[56] References Cited

U.S. PATENT DOCUMENTS

| | | | |
|---|---|---|---|
| 4,234,952 | 11/1980 | Gable et al. | 370/85.3 |
| 4,439,763 | 3/1984 | Limb | 370/85.2 |
| 4,498,168 | 2/1985 | Tseng | 370/85.3 |
| 4,779,267 | 10/1988 | Limb | 370/85.5 |
| 5,012,467 | 4/1991 | Crane | 370/85.2 |

OTHER PUBLICATIONS

Borgonovo, "ExpressMAN: Exploiting Traffic Locality in Expressnet", IEEE Journal, vol. SAC-5, No. 9, Dec., 1987.

Primary Examiner—Douglas W. Olms
Assistant Examiner—Min Jung
Attorney, Agent, or Firm—Antonelli, Terry, Stout & Kraus

[57] ABSTRACT

A unidirectional bus data communication system which eliminates uncertainty as to the integrity of data received by a receiver connected to the bus, which data may have been involved in truncating collisions. A plurality of data stations are connected to a unidirectional bus which has segments connected to and between the stations. Each of the stations is connected to an upstream segment by a sense (S) lead and to a downstream segment by a transmit (T) lead. Each station is adapted to sense energy via its S lead arriving on an associated upstream segment of the bus and includes a transmitter for transmitting data signals via its T lead on an associated downstream segment of the bus. Signal delay elements interconnect upstream and downstream segments of the bus bypassing each of the stations. The time delay D of each of the signal delay elements is a function of the total interval of a predetermined group of data signal bit durations of the data signals added to a period $T_d$ which is equal to the time between arrival of energy at an S lead and the instant when an associated transmitting means can, in response to such detection, stop transmitting energy on its T lead.

28 Claims, 3 Drawing Sheets

SYSTEM FOR IMPLEMENTING IMPROVED ATTEMPT-AND-DEFER ACCESS CONTENTION PROTOCOL

FIELD OF THE INVENTION

This invention relates to a local data communication system such as a local area network having means for ensuring the integrity of data carried on the network bus which may be subject to collisions. The invention is more particularly directed to such a system which utilizes attempt and defer contention protocols.

BACKGROUND TO THE INVENTION

In a network or bus system using an attempt and defer access contention protocol (hereinbelow referred to as AADACP), data is carried on the bus in a unidirectional format. Stations (or terminals) are connected to the bus with transmitters upstream and the receivers of each of the stations downstream of the most downstream transmitter. The bus therefore usually is in a U or S form. Each station includes a sense (S) and a transmit (T) lead connected to the bus, with the S lead upstream of the T lead. For energy passing downstream on the bus, a detector connected to the S lead senses the energy or the termination of energy and causes the station transmitter either to cease transmitting or to attach data to the end of a data train passing down the bus. Several different types of such systems are described in U.S. Pat. No. 4,498,168 to C. W. Tseng, issued Feb. 5, 1985, to which the reader is referred.

In a bus system using AADACP, a station having a packet to transmit waits until there is no activity on the bus at a point just upstream of the point at which the transmitter of the station is connected to the bus. For some unidirectional bus systems that use AADACP, such as ExpressNet and D-Net, transmission opportunities occur only just at the time that other upstream activity stops. Other unidirectional bus systems, such as the MAP protocol of the C-Net system, also permit a station to transmit at other times when there is no upstream activity. ExpressNet is described by Fouad A. Tobagi, Flaminion Borgonovo, and Luigi Fratta in "Expressnet: A High-Performance Integrated-Services Local Area Network", IEEE Journal on Selected Areas in Communications, Vol SAC-1, Nov. 5, November 1983. D-Net is described by C. W. Tseng, and B. U. Chen, in "D-Net, A New Scheme for High Data Rate Optical Local Networks", IEEE Journal on Selected Areas in Communications, Vol. SAC-1, April 1983. The MAP protocol of the C-Net system is described by Marco Ajmone Marsan, and Guido Albertengo in "Integrated Voice and Data Networks", Comput. Communications, Vol. 5, No. 3 (June 1982), pp. 119-127.

When the bus exhibits no activity, a station commences to transmit a preamble on the downstream portion of the bus. The preamble typically serves two purposes in the prior art: 1) to indicate to downstream stations that a data packet will follow immediately, and 2) to provide an opportunity for downstream receivers to train their local clocks to a frequency appropriate for the reception of the packet. The preamble usually consists of an unmodulated carrier of which the frequency is a fixed multiple of the bit rate of the packet body.

Because of the unidirectional nature of the bus, the activity of transmitting does not prevent the transmitting station from detecting activity on the upstream portion of the bus during the transmission. When the station has completed the transmission of the packet preamble, it commences to transmit the body of the packet. If a preamble sent by an upstream station arrives at the station while it is transmitting the preamble or the body of a packet, the station stops transmitting immediately. The arriving preamble is long enough so that most of the arriving preamble is not overlapped by the stopped transmission; all of the body of the following packet is untouched by the stopped transmission. Thus most of the preamble arriving from upstream, and all of the packet body that follows it, passes the station without corruption.

The AADACP procedure is distinguished from CSMA/CD procedures in which a collision corrupts both colliding packets, and in which neither packet can defer to the other in such a way that one packet is left uncorrupted. In AADACP, one of the two colliding packets is considered to be intact. An example of a standard CSMA/CD procedure is described in the IEEE 802.3 CSMA/CD standard, 1985 entitled CARRIER SENSE MULTIPLE ACCESS WITH COLLISION DETECTION.

In a typical AADACP system, a station having data to transmit on the bus waits until the sensor connected to its S lead indicates that there are no signals arriving from the upstream portion of the bus. Once signals from upstream become absent after a preceding presence, downstream stations are permitted to transmit by appending packets to a train of packets. Then a station begins to transmit a packet preamble to the downstream portion of the bus via its T lead, while continuing to use its S lead to detect the commencement of activity upstream. The packet preamble is transmitted by the transmitting station for a period of time $T_p$. The packet preamble may consist of, for example, an unmodulated carrier or a particular sequence of bits to facilitate synchronization of downstream receivers. When the station has completed transmission of the packet preamble it then transmits one or more packet bodies. If the S detector lead of the transmitting station detects upstream transmission activity at any time during transmission of the packet preamble or packet body, the transmitting station terminates the transmission as quickly as possible. A signal collision, however, would have occurred, corrupting the overlapped signals prior to shut-down of the transmitter.

For any conceivable transmitter, a certain minimum of time $T_d$ must elapse between the arrival of an upstream transmission at the S lead of a transmitter and the instant when a transmitter can stop emitting energy to the bus or other medium through its T lead. Similarly a minimum elapsed time is required before a station can detect the disappearance of activity at the associated S lead and the instant when it starts emitting energy to the medium. This latter time is usually taken to be equal to $T_d$. Because there is no significant propagation delay between the S and T leads, a transmitter station waiting for the end of an upstream transmission cannot begin transmitting until an interval $T_d$ after the end of the upstream transmission passes it. This results in a minimum unused time gap of $T_d$ between packets of a packet train.

Further, a transmitter overwrites the first part of a transmission from upstream that arrives at its S lead at the instant that it begins transmitting to its T lead (creating a collision). It overwrites such an upstream transmission during the period $T_d$ before it is able to detect the transmission from upstream at its S lead and then defer to the transmission from upstream by truncating its own transmission. This means that a transmitter with traffic to send will overwrite the initial part of the packet preamble of every packet that passes, until it gets an opportunity to complete its transmission. Since an uncorrupted portion of the packet preamble is required for synchronizing the clocks of downstream receivers the time interval, $T_p$ is extended in these cases by an interval of $T_d$ in order to provide a portion of the packet preamble that is allowed to be overridden by downstream stations.

It should be noted that a transmitter station having traffic to send will sense the energy gap at the end of each packet in the train of packets just in time to start transmitting at the precise instant that the leading edge of the packet preamble of the following packet arrives at its S lead. Such a transmitter may overwrite the initial part of any packet preambles that arrive until it has its chance to complete the transmission at the end of the packet train.

In the article by F. Borgonovo, "Expressman; Exploiting Traffic Locality in Expressnet" IEEE Journal on Selected Areas in Communications, Vol. 5, No. 9, December 1987, pp. 1436-1443, it is briefly mentioned that overwriting of a preamble may be avoided by inserting a delay element between the S and T leads having a delay of $T_d$ and by delaying the start of transmission by the same amount ($T_d$). It should be noted that this technique still leaves a gap of duration $T_d$ between packets of a packet train, but eliminates the overwriting of packet preambles in the middle of packet trains. This also does not prevent packet loss and duplication due to collisions that occur while a packet is being transmitted.

The terminology of the prior art does not distinguish clearly between two different circumstances of collision: the deferral of a downstream transmitter before it has completed transmission of a packet preamble, and deferral of a downstream transmitter after it has begun to transmit the body of the packet following the packet preamble. The term collision is used indiscriminately to refer to either of the two circumstances of deferral. It is necessary to distinguish them, thus 1. preamble collision, or P-collision, when a downstream station defers while transmitting its preamble, and to a 2. truncating collision, or T-collision, when a downstream station defers while transmitting the body of a packet.

It is not necessary for receivers to take any action with respect to P-collisions except to defer promptly, because there is no possibility that the packet whose transmission is aborted during such a collision will be successfully received and thus used.

T-collisions, on the other hand pose the following problem: A transmitter, when it truncates a packet body during a T-collision, will retransmit the packet at some subsequent time. If there is any possibility that a destination receiver received the packet body correctly, the packet may be received twice by a receiver, which may be very undesirable. If there is any possibility that the transmitter may not detect a T-collision that has corrupted a packet, the packet will be lost.

SUMMARY OF THE INVENTION

The present invention addresses the problem of ensuring the integrity of data transmitted on the bus in a system with AADACP, that permits T collisions.

The present invention also relates to a system for implementing AADACP in a unidirectional high speed bus system that produces many T-collisions continuously during normal operation, e.g. even as many as thousands of T-collisions per second.

In one embodiment of the invention a delay element is used to eliminate the unused gap between packets of a packet train, thus making the bus system more efficient.

In a prior art system of the type described above, where T-collisions are allowed in a system using AADACP, there can be uncertainty at the transmitter as to whether a T-collision has occurred, and if a T-collision has definitely occurred, there can be uncertainty as to whether it has sufficiently distorted the downstream packet so that a receiver will reject the packet.

A packet typically is comprised of a start flag, a header, a data body, a frame check sequence, (FCS), and an end flag. A packet typically is not accepted by a receiver if the end flag is missing or has been corrupted. If the transmitter station cannot decide whether the end flag has been properly transmitted, it cannot decide whether it should resend the packet, since duplication may result if the first packet was received correctly. If the packet is not transmitted because the transmitter station decides wrongly that the end flag was not corrupted, the packet will be lost. Since $T_d$ is assumed to be less than the time required to transmit one bit, and since termination of transmission occurs $T_d$ after the arrival of a transmission from upstream at the S lead, if a transmission is cut off during transmission of the last bit of the terminating flag, the transmitter station cannot decide whether it has transmitted that last bit correctly. This uncertainty exists in the prior art whether or not there is an overlap with the upstream transmission. Therefore even by inserting a delay of $T_d$ in the bus between each S lead and T lead, as suggested by Borgonovo, the problem of deciding whether the final bit in the end flag has been transmitted correctly cannot be resolved.

The present invention is directed to means for ensuring certainty of the integrity of the transmitted data. A signal delay element is used in series with the bus between each S and T lead. The time delay D of each of the signal delay elements is made a function of the total interval of a predetermined group of data signal bit durations of the data signals transmitted on the bus from the T lead added to the time period $T_d$. These elements each have a time delay to prevent T-collision uncertainty.

In an embodiment of the invention, the system always transmits the end flag in the form which permits the receiver to decide whether the transmitter station has detected a T-collision. Either none of the end flag or enough of the end flag to be reliably recognized by receivers is transmitted. The amount of delay D in the bus introduced between the T and S leads of each station is used to ensure that enough of the end flag is always transmitted so that it can be reliably recognized by receivers, provided transmission of the end flag begins before a transmission from upstream has been detected by the detector connected to the S lead. The station transmitter checks whether an upstream transmission has been detected just before beginning transmission of the end flag. If no upstream transmission has been detected at that time, the transmitter unconditionally transmits enough of the end flag to be recognized reliably by receivers. Because of the inserted delay $T_D$, this unconditional transmission does not result in overlapping of the upstream transmission with the critical portion of the end flag.

In case transmission from upstream has been detected on the S lead prior to transmission of the end flag, none of the end flag is transmitted.

As a result, the receiver can reliably accept the packet, because it recognizes the critical portion of the end flag, or it can reject the packet because none of the end flag had been transmitted and could be detected by the receiver. The transmitter station on the other hand, recognizes (knows) whether an end flag has been transmitted or not. If an end flag has been transmitted, it does not retransmit the packet. If an end flag has not been transmitted, the transmitter retransmits the entire packet at a later time.

The prior art AADACP systems are unsuitable for the use of modulation and transmission techniques that favour start-stop transmission. The increasing availability of channels of very large bandwidth lessens the need for modulation techniques that are extremely efficient in their use of bandwidth. ASK and FSK (amplitude-shift keying and frequency shift keying) used with start-stop character mode transmission are examples of simple modulation techniques that require large bandwidth, and which are suitable for very high speed transmission.

Thus prior art use of start-stop transmission techniques has been confined to relatively low bit rates in situations not using AADACP techniques, e.g. Teletype TM and relatively low speed computer communications. The present invention combines AADACP, the invention described above and below, and further invention, to start-stop transmission techniques, adapting them to particular advantage for unidirectional bus systems in which T-collisions can occur frequently.

To adapt AADACP for start-stop transmission unidirectional bus systems in which T-collisions are frequent, for example, we use a special format for a destructible preamble, or locomotive, that precedes each packet train. Locomotives are used in the prior art to enable a head-end station that has no traffic to initiate a packet train. The locomotive used in the present invention has a format that ensures immediate realignment of receivers on a data block (a block, which is a small fixed number of bits, will be described in more detail below) following a block that has been overlapped in a T-collision. This refinement is required only if overlapping of blocks occurs during collisions.

The present invention includes means for eliminating uncertainty at the transmitter as to whether a T-collision has occurred. The invention also provides a method for producing precise control over the duration of the gaps between packets of a packet train.

In general, a preferred form of the invention is a data communication system comprising a plurality of data stations and a unidirectional bus having segments connected between the stations, each of the stations being connected to the bus upstream of the station by a sense (S) lead and to the bus downstream of the station by a transmit (T) lead, each station being adapted to sense energy via its S lead arriving on the bus upstream of the station and including transmitting apparatus for transmitting data signals via its T lead on the bus downstream of the station, signal delay elements having a delay D interconnecting each of the upstream and downstream segments of the bus bypassing each of the stations, the time delay D of each of the signal delay elements being a function of the sum total interval of a predetermined group of data signal bit durations of the data signals added to a period $T_d$ which is equal to the time between arrival of energy at an S lead and the instant when an associated transmitter of the station can, in response to such detection, stop transmitting energy on its T lead.

In accordance with a particular aspect of a first embodiment, the data signals are in the form of packets, each being comprised at least of a start flag and an end flag, each end flag containing a minimum recognizable leading portion (MRLP) comprised of predetermined bits extending over a predetermined interval $T_{MRLP}$, wherein $D \geq T_{MRLP} + T_d$.

In accordance with a particular aspect of a second embodiment, the data signals are in the form of packets, each packet being grouped into basic bursts of data, each packet including a first start of packet burst (SOP) and a final end-of-packet burst (EOP) being formed of a similar number of bits and having a predetermined burst duration B.

BRIEF INTRODUCTION TO THE DRAWINGS

A better understanding of the invention will be obtained by a consideration of the description below, in conjunction with the following drawings, in which.

DESCRIPTION OF THE INVENTION

Figure 1:
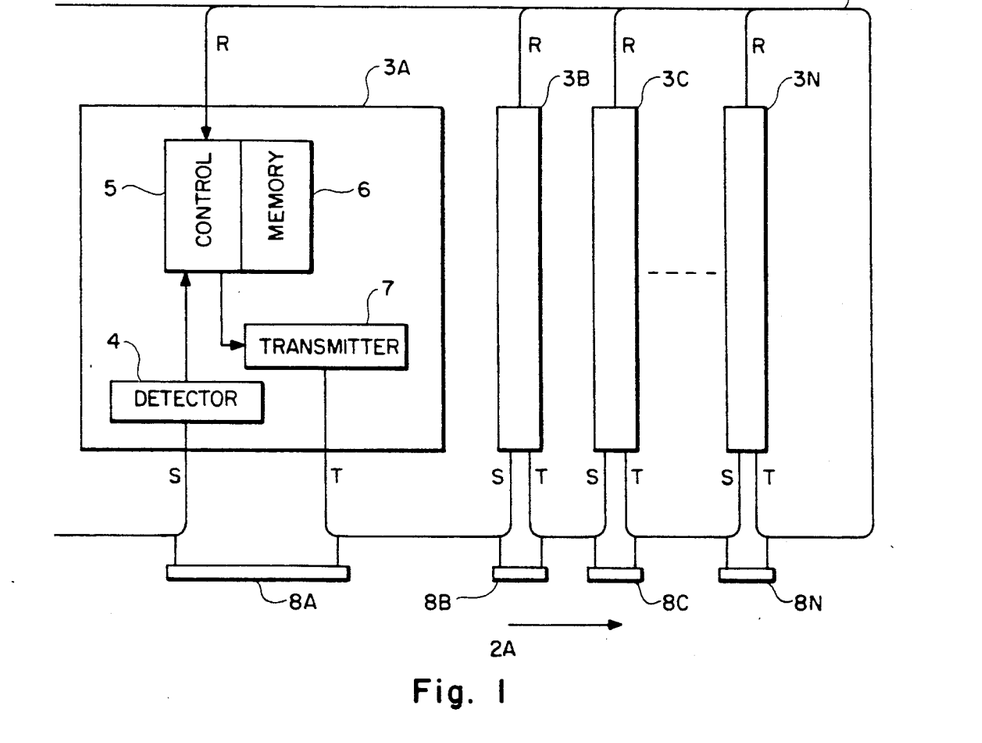
FIG. 1 is a block diagram of a form of the present invention.

Turning now to FIG. 1, a representative unidirectional bus 1 is illustrated, in which the direction of transmission is shown by arrows 2A and 2B. A plurality of stations 3A, 3B, 3C . . . 3N is connected to the bus via S (sense), T (transmit) and R (receive) leads. Each S lead is connected to a corresponding detector 4. In each station the detector is connected to a controller 5, which includes an associated memory 6. Each controller 5 is also connected to an associated R lead which is connected to the bus 1. The controller 5 is also connected to a data transmitter 7. Each data transmitter 7 is connected to an associated T lead which is connected to the bus 1.

For each station, the S lead is connected to the bus upstream of the T lead. Thus the unidirectional bus has segments connected between the stations, each of the stations being connected to the bus upstream via its S lead, and to the bus downstream by its T lead.

Each S and T lead pair is connected together, making the bus continuous, by a corresponding signal delay element 8A, 8B, 8C . . . 8N. The receive R leads from each stations are connected to the bus 1, which can be in sequence downstream of the most downstream T leads. The particular sequence of connection of the R leads to the bus system is not of consequence, and therefore connections to the bus that allow stations to simultaneously receive, last to transmit being first to receive, or last to transmit being last to receive, or any other order, can equally be used. In accordance with the present invention, the delay D in each of the signal delay elements is a function of the total sum interval of the time incurred for a predetermined group of data signal bit durations of the data signals transmitted along the bus to arrive at a fixed point of the bus, and the period $T_d$ which is equal to the time between arrival time of energy at an S lead and the instant when an associated transmitter can, in response to the detection, stop transmitting energy on its T lead.

Figure 2:
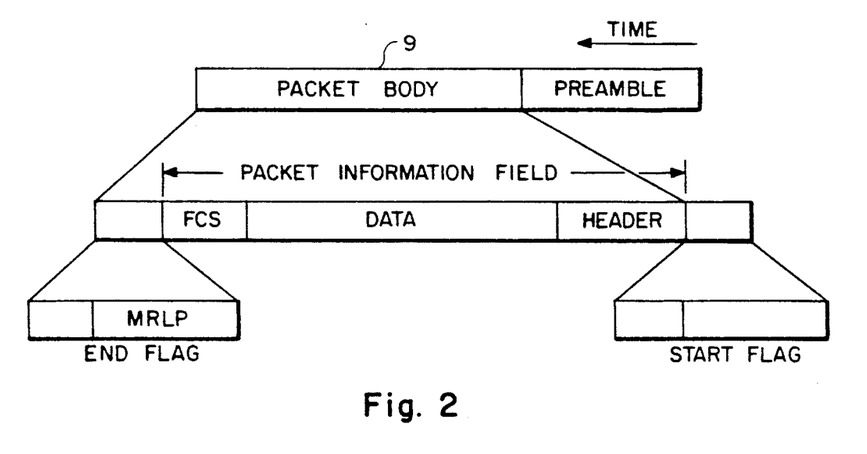
FIG. 2 shows a representative exploded data packet used with a first embodiment of the invention.

In one embodiment, the transmitted signal along the bus is formed into packets 9 comprised of at least a start flag and an end flag (as shown in FIG. 2). Each end flag contains a minimum recognizable leading portion (MRLP) comprised of predetermined bits extending over predetermined period $T_{MRLP}$. The predetermined group of signal bit durations of the data signals referred to above consist of the interval $T_{MRLP}$.

Figure 3:
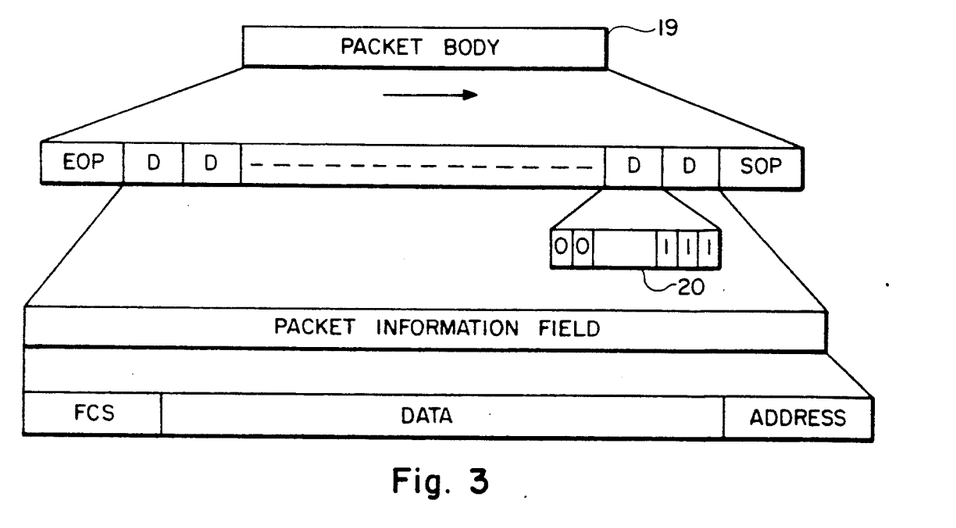
FIG. 3 shows a representative exploded data packet used with a second embodiment of the invention.

In accordance with a second embodiment, the data signals are in the form of packets 19, each packet being grouped into bursts of data (see FIG. 3). Each burst, except a first start-of-packet (SOP) burst and a final end-of-packet (EOP) burst is formed of a similar number of bits and has a predetermined burst duration B. In this embodiment the time delay D of each delay element is equal to or larger than the predetermined burst duration B added to $T_d$.

In another form of the second embodiment, the delay D of each delay element is smaller than the sum $B+T_d$ but is not smaller than $T_{MRLP}+T_d$.

PREVENTING T-COLLISION UNCERTAINTY

When data is to be transmitted on a T lead, it is stored in memory 6 at the station (see FIG. 1). The controller 5 retrieves it and forms it into packets, applies it to transmitter 7 and enables transmission on the T lead at a particular time.

When forming a packet, controller 5 should prepare a minimum recognizable leading portion (MRLP) of the start flag. Reference is made to FIG. 2, which represents a packet, with various portions exploded to show detail. It may be seen that the end flag contains a minimum recognizable leading portion (MRLP) which extends from the beginning of the end flag. Depending on the encoding and transmission technique preferred, the MRLP of the end flag may be the whole length of the end flag, or it may be less. The time delay of each of the delay elements 8A–8N is made equal to the total bit time of the MRLP portion of the end flag ($T_{MRLP}$) added to the time interval $T_d$ between sensing of energy upstream of the station on the S lead by detector 4 and the instant when transmitter 7 actually ceases transmission under control of controller 5 having received the indication of the detection of energy from detector 4.

Therefore for this embodiment the delay D of each delay element is $$D \geq T_{MRLP} + T_d$$

In operation, the controller 5 causes transmission of the packet by transmitter 7 on the T lead to the bus to which it is connected. Just prior to transmission of the end flag of the packet, the controller 5 verifies from the detector 4 that energy from upstream on the bus has not been detected from the associated S lead. If energy from upstream on the bus has been detected, the controller 5 causes transmitter 7 to not send an end flag. If there is no transmission detected from upstream, the controller 5 causes transmitter 7 to transmit at least all of the MRLP of the end flag, and no more than the entire end flag The particular delay D ensures that the MRLP of the end flag will never be overlapped with a transmission from upstream.

In some cases, the portion of the end flag following the MRLP may have energy from upstream collided with it. In such cases, the signal from upstream must contain a packet train preamble (distinguishable from a packet preamble), referred to below as locomotive, that can be partly consumed by such collisions.

Some systems may be designed to not permit colliding transmissions to overlap, and in those cases a locomotive may be dispensed with, although a locomotive may still be desired to be used to provide a means for stations that have no packet traffic to initiate a packet train.

Preferably, the control and/or the transmitter divides each packet transmission into a sequence of blocks, each consisting of a small fixed number of bits. Successive blocks of a packet may, or may not, be transmitted in a synchronous stream of bits. The end flags and start flags should be transmitted entirely within a block. Thus a block must be at least as long as the end flag. The beginning of the end flag is aligned at the beginning of the first block following the packet information field (see FIGS. 2 and 3). The packet information field should be padded out, if necessary, to a length equal to a multiple of the block length.

The control and transmitter should completely suppress transmission of a block of packet if energy from upstream is detected during the transmission of the preceding block, but should always complete transmission of a part of a block at least equal in length to the MRLP of the end flag, once transmission of that block has begun. The control should keep track of how many blocks have been transmitted when transmission has been terminated. Thus it can determine whether it has completed transmission of the MRLP of the end flag.

Let $T_{block}$ be the amount of time required for a block to propagate past a fixed point of the bus. The maximum possible overlap of the upstream and downstream transmissions during a T-collision thus has a duration of $$T_{overlap} = T_{block} - T_{MRLP}.$$

Thus the end flag cannot be corrupted sufficiently in the above-described embodiment to become unrecognizable to receivers. The end flag is either not transmitted at all, or is transmitted in a form that can be recognized by receivers, since a complete MRLP has been transmitted. For each packet, the control can know or determine whether it has transmitted an end flag. If no end flag has been transmitted, the transmitter should retransmit the packet without risk of duplication, since the receiver should operate to reject any packet that has a missing end flag If an end flag has been transmitted, the control does not cause the transmitter to retransmit the packet.

Controller 5 of the station, in timeshare used as a receiver control, or a separate control represented by controller 5, connected to the receive lead R, detects the end flag of a packet. The control computes the frame check sequence (FCS) of the packet and retains the packet if the value of the FCS computed is consistent with the FCS value in the packet. If a packet is missing an end flag, the packet is discarded (rejected) immediately.

The end flag of a received packet should be considered to be missing if the controller 5 determines that:

(1) a packet start flag has been received after starting reception of a packet, before an end flag has been received (attributed to a T-collision only when packet trains are never preceded by a preamble).

(2) when a locomotive has been detected after starting reception of a packet, but before an end flag has been received (always attributed to a T-collision). When packet trains are never preceded by a locomotive, this criteria is not used.

(3) when a quiet period on the bus has been detected after reception of a packet has begun, but before an end flag has been received. The duration of the quiet period is not critical, but should be longer than the period permitted between packets of a packet train, in order to allow the other criteria an opportunity to catch a T-collision if such is the real cause of the missing end flag. Corrupt packets detected in this way should not be attributed to T-collisions. Such corruption would usually have resulted from modification of the end flag by a noise source.

The third criterion noted above speeds up the detection of corrupted packets at the end of a packet train, and ensures that the corruption will be attributed to a noise source, rather than to a T-collision. The absence of this criterion would not introduce either loss or duplication.

Since the transmitter retransmits a packet whenever a packet is truncated in a T-collision, there will be no loss of packets due solely to T-collisions. The transmitter concludes that a packet has been truncated only when it has not transmitted any portion of the end flag. Since the receiver discards any packet that is missing its end flag, duplication is not possible as a result of a T-collision alone.

There is an improbable event which can interrupt this result. A noise source may intervene to create an end flag for a packet which has only its end flag missing by the above function as a result of a T-collision. If this happens, duplication will occur as a result of the retransmission. A frame check sequence calculation cannot detect the erroneous packet, since the transmission of the FCS portion of the packet precedes the transmission of the end flag.

In another improbable event that can create an erroneous end flag, there can be overlapping of a packet preamble with the end of a packet body having an end flag missing due to it not being transmitted because of the detection of a collision. In other words, the overlap of the two transmissions could create an end flag by the overlapping. This could occur should $T_{MRLP}$ be smaller than $T_{block}$, since the MRLP of the end flag always lies at the beginning of the block and two transmissions never overlap on the leading edge of the block equal to the length of the MRLP of the end flag. It is desirable to arrange the encoding of the packet preamble so that the probability of creating an end flag in this manner is as small as possible. The occasional creation of an end flag by the overlapping of a locomotive with the data portion of the packet is very likely to be detected, since there is a very high probability that the shortened packet will fail its FCS verification. The T-collision will then be counted as an FCS error.

However a very high rate of creation of end flags could eventually lead to acceptance of a corrupted packet when the last bits of the shortened packet happens to form a correct FCS for the shortened packet.

The creation of end flags by T-collisions can be completely avoided by an appropriate choice of encoding of the locomotive, the end flag, and the packet data. An example of this form of encoding will be described below in the embodiment relating to start-stop mode transmission.

MINIMIZNG TIME GAPS BETWEEN PACKETS

As noted earlier, a certain minimum period of time $T_d$ must elapse between the arrival of transmission energy from upstream at the S lead of a station and the instant when the transmitter stops emitting energy to the bus through its T lead.

The prior art requires gaps between the packets of a packet stream at least $T_d$ in duration, and sometimes requires partial overwriting of transmissions from upstream as well. Either overwriting or gaps could be eliminated, but not both, and it is sometimes desirable to maintain either gaps or overwriting. The durations of gaps and overwriting in the present invention are shorter than that required in the prior art. An embodiment of the present invention provides means for control of gaps and overwriting, and a specific method for the case of SSBMT (start-stop block mode transmission, which is a mode of transmission in which packets are broken up into small fixed length blocks that are transmitted separately, without a necessarily controlled relationship between the phase of bits in different blocks).

The embodiment described below is suitable for use in systems in which the end of signal can be delimited simply by the time at which the S lead detects the disappearance of energy sensed while the signal is passing the S lead. The embodiment can be applied to modulation schemes in which transmitted signals contain energy in every part of the transmitted signal. This embodiment also provides a refinement for specific application to SSBMT; the refinement is described later as part of the description of the invention as applied to SSBMT.

Recall the definition of $T_d$ in prior art systems; for any conceivable transmitter, the physical principles of the connections to the transmission medium require that a certain minimum period of time, $T_d$, must elapse between the arrival of an upstream transmission at the S lead of a transmitter and the point in time when the transmitter can stop emitting energy to the medium via its T lead. $T_d$, the delay to stop transmitting is distinguished from $T_{deot}$, the time required to detect the end of a packet train, defined as follows.

$T_{deot}$, the time required to detect the end of a packet train, is the total time required station to detect a disappearance, of a certain minimum duration, of the energy of a signal passing its S lead in the downstream direction. $T_{deot}$ is always greater than this minimum detectable gap. The minimum duration of the gaps detected by the S lead places an upper bound on the gaps that may appear in a packet train without being detected as an end of train. Typically, the maximum gap present in a packet train must be distinctly less than the minimum gap which will be detected as an end of train at the S lead.

Let $T_{tc}$ denote the transmission commencement delay. The transmission commencement delay is the delay introduced by the transmitter between the detection of the end of a packet train at its S lead and the commencement of transmission at its T lead.

By choosing $T_{tc}$ to have the value $$T_{tc1} = D - T_{deot}.$$

where D is the propagation delay of each delay element, the average duration or gaps between the packets of a packet train can be made zero. Small variation of the value of $T_{deot}$ and $T_{tc}$ between stations will produce deviations from perfect alignment of appended packets with the end of the packet stream to which they are appended, with small overlaps and small gaps being produced. The magnitude of these small variations is determined by the magnitude of the variations of $T_{deot}$ and $T_{tc}$, which can be made much smaller than $T_{deot}$, thus gaining an advantage over the prior art in which either the overlap, or the gap, or both are equal to Td, which is greater than the variations in $T_{tc}$ and $T_{deot}$.

If it is desired to eliminate overlap (overwriting) completely, a small gap may be introduced between packets of a packet train by starting transmission a little later than $T_{tc1}$. This gap, of average duration g, is chosen to be just large enough to ensure that variations between stations of the quantities $T_{tc}$, $T_{deot}$, and D can never reduce the gap by more than g. In this case $T_{tc}$ must be given the value $$T_{tc2} = D - T_{deot} + g$$

If it is desired to eliminate gaps entirely, there must always be a slight overlap, or overwriting of the packet train to which a packet is appended. An overlap can be introduced by starting transmission a little earlier than $T_{tc1}$. This means that there must be a small destructible trailer, or postamble, on the end of a packet train, and a small destructible preamble on the packet to be appended to it. In order to minimize the average amount of overwriting, we choose ovwd, the average overwrite duration, just large enough to ensure that variations between stations of the quantities $T_{tc}$, $T_{deot}$, and D can never reduce the overlap sufficiently to cause a gap. In this case $$T_{tc3} = D - T_{deot} - ovwd.$$

In the preferred embodiment the time delay D is a length of transmission line connected in each delay element 8A-8N. In this case, the value of D can be determined by accurate specification of the length of transmission line to be used. In this way the value of D can be implemented sufficiently accurately so that it may be assumed not to vary between stations.

Figure 8:
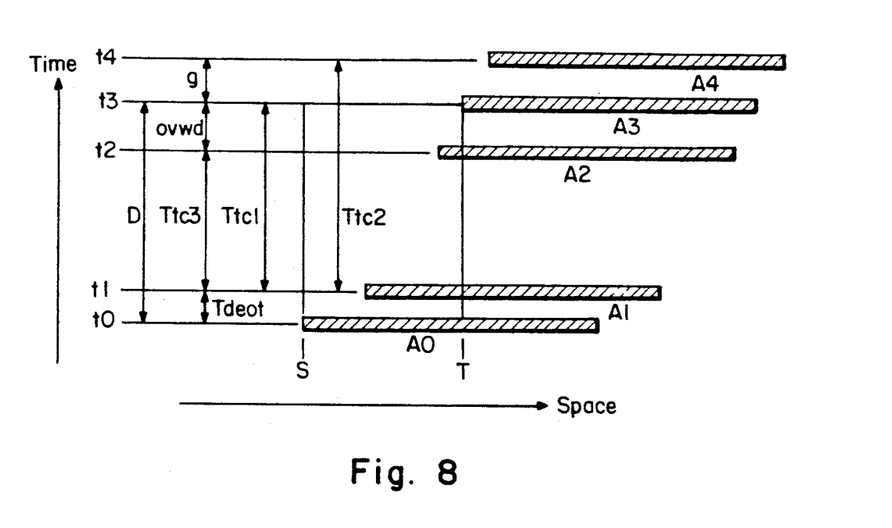
FIG. 8 is an illustration of a transmission at a station at several instants in time.

The relationships of the time intervals just described are displayed in a time-space diagram in FIG. 8. This figure shows five positions of an upstream transmission relative to the S and T leads of a station. The station to which the S and T leads are connected has traffic to append to the upstream transmission. The positions are numbered A0 to A4. Each position is occupied by the upstream transmission at time tN.

At time t0, the trailing edge of the upstream transmission (A0) is just arriving at the S lead (shown as point S).

At time t1, the S lead indicates the passing of the trailing edge of an upstream transmission (A1). In response to this event, the transmitter must initiate a transmission in order to append its traffic to the upstream transmission. The transmitter requires an interval $T_{tc}$ in order to initiate a transmission, of which a part may be a delay introduced to ensure that the transmission does not start too early. The diagram shows consequences of each of the $T_{tc}$ values $T_{tc1}$, $T_{tc2}$, and $T_{tc3}$, any of which may be chosen according to the amount of overlap desired between the upstream transmission and the transmission to be appended to it.

If transmission starts at time t3 (A3), $T_{tc1}$ after t1, there will be no gap between the upstream transmission and the appended transmission, because the transmission starts at the T lead (shown as the point T) just as the trailing edge of the upstream transmission arrives at the T lead.

If transmission starts at t4 (A4), $T_{tc2}$ after t1, there will be a gap of duration g between the upstream transmission and the appended transmission, because the transmission starts at the T lead after the trailing edge of the upstream transmission has passed the T lead.

If transmission starts at t2 (A2), $T_{tc3}$ after t1, the appended transmission will overwrite the upstream transmission for a period ovwd, because the transmission starts at the T lead before the trailing edge of the upstream transmission arrives at the T lead.

Note that the time interval of duration t3−t0=D is the time required for the end of the upstream transmission to propagate from the S lead to the T lead.

START-STOP BLOCK MODE TRANSMISSION

As noted earlier it is preferred to encode packets as a sequence of short blocks or bursts. The delay in each of the delay elements 8A-8N is chosen to suit a particular encoding All bursts are of the same short length. Packets are transmitted by encoding each packet as a sequence of bursts: the bursts are transmitted in sequence.

Figure 4:
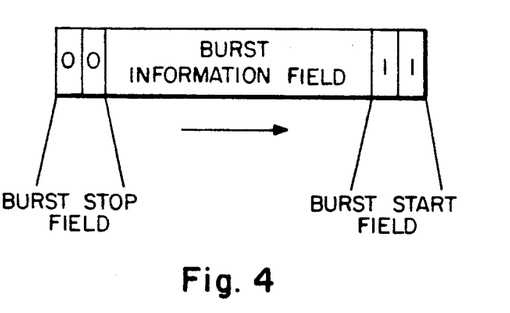
FIG. 4 shows a representative data burst portion of a packet.

A representative burst format is shown in FIG. 4. The burst is comprised of a burst start field, followed by a burst information field, followed by a burst stop field. The arrow shows the direction of propagation.

The function of the burst start field is to enable a station to detect the presence of a burst and to get ready to receive and decode the burst information field. For amplitude shift key (ASK) modulation in which the 1 bits have high energy and the 0 bits have low energy, the transmission of a number of 1 bits would serve as the burst start field. The number of 1 bits required is determined by the design of the stations. The preferred form of the burst start field is two 1 bits.

A burst stop field is utilized to facilitate the recognition of an immediate following burst start field. This requires a signal that contrasts with the signal used for the burst start field. For ASK modulation, a number of 0 bits will provide the necessary contrast with the 1 bits of a following burst start field. The preferred form of the burst is a burst stop field having two 0 bits.

The symbols below are used in the description below:

1. $T_d$ (delay to stop transmitting)=the total time required to a station 1) to detect the presence at the S lead of energy arriving from upstream, 2) to determine whether to suppress transmission at the T lead, and 3) to stop transmission at the T lead.
2. D=The bus propagation delay between the S and T leads, chosen according to the present invention.
3. s=Duration (emission time or reception time) of the burst start field.
4. b=Duration of a single bit.
5. B=Duration of a single burst, including the burst start field, the burst information field, and the burst stop field.

Refer now to FIG. 3 which illustrates a preferred form of packet body 19 in exploded form. The packet body is encoded with a start of packet burst (SOP) containing the start flag (ref. FIG. 2), followed by a packet information field, followed by an end of packet burst (EOP) which contains the end flag. The arrow under the packet body 19 indicates the direction of propagation on the bus. There is no packet preamble. The packet body is the whole of the packet transmission.

The packet information field is encoded as a series of data bursts D, exploded at reference 20 to conform with the form shown in FIG. 4.

In order to distinguish the SOP and the EOP from the data burst, the SOP and EOP must have burst information field values which differ from each other and from all data burst information field values. In order to distinguish, at least one more bit is preferably contained in the burst information field than is required to encode the bits of the packet information field carried by each data burst.

The time gap between each of the bursts of the packet are required to be less than the time gaps at the end of a train of packets that is to be interpreted by the control of the transmitters of the stations as an opportunity to transmit. This is different from prior art start-stop mode transmissions. For example, previous start-stop character mode stations have no constraint on the time between character transmissions.

In the present start-stop mode transmission embodiment, the structure used as described in the first embodiment to prevent corruptions of the whole last burst transmitted is utilized to prevent corruption of the EOP when the EOP is the last burst transmitted. The block length in this case is the length of the burst. The delay to be introduced by each of the delay elements 8A-8N should be greater than or equal to the sum of the duration of the burst and the detection time, i.e.

$$D \geq B + T_d$$

The control of the transmitter at each station should verify just before beginning transmission of each burst whether an upstream transmission has been detected at its S lead. If no upstream transmission has been detected, the transmitter should be enabled by control 5 to transmit a whole burst. The time delay of the associated time delay element 8A-8N ensures that there will always be time for the transmitter to complete transmission of the burst without overriding a transmission arriving from upstream on the bus. Only whole bursts are transmitted, and thus there are no additional constraints on the encoding of SOP and EOP other than described above, i.e. that the SOP and EOP should have burst information field values which differ from each other and from all data burst information field values; at least one more bit is required in the burst information field than is required to encode the bits of the packet information field carried by each data burst.

Since there will be no overlapping of transmissions, there is no need for a locomotive, although a locomotive may be present for other reasons.

Since any packet truncated by a T-collision would always consist of a whole number of bursts, a station receiver can always determine unambiguously whether a packet has been truncated by detecting that the packet has not been terminated by an EOP by the time the SOP of the following packet arrives, or that the end of a packet train has arrived, or that a locomotive (if used) has arrived. The transmitter is caused to retransmit a packet only in the event that it has not succeeded in transmitting the EOP of the packet. The only way that this can create duplication of packets at the receiver is in the situation in which the transmitter sends all but the EOP of the packet in the first (truncated) transmission: if a transmission error or noise source intervenes to transform the first burst following the truncated packet into an EOP, then two correct copies of the packet may be received at the receiver, if the FCS calculation verifies.

Since there is no possibility of overlap, there is no possibility of the creation of an end flag (an EOP) by a T-collision.

Prevention of T-collision uncertainty can be used in start-stop block transmission in such a way that it prevents corruption of only a leading portion of the last burst of transmission in a T-collision. In this case the block size is the size of the burst. The length of the portion of the burst that is guaranteed not to be corrupted is equal to the length of the MRLP of the EOP, thus ensuring that the EOP is transmitted in a form that is recognizable to receivers. In this case the delay of each of the delay elements 8A-8N should be less than the sum of the duration of the burst and detection time, $$D < B + T_d$$

As described with respect to the first embodiment, the transmitter is caused to either truncate the transmission of the burst being transmitted when the arrival of an upstream transmission is detected at the S lead or to overwrite the first few bits of the transmission from upstream by completing transmission of the burst before suppressing transmission.

Because station receivers should typically recognize and consume an entire burst, even if the transmitter could terminate a burst before it has been completely transmitted, it is preferred to transmit complete bursts for reasons of efficiency and simplicity.

It should be clear that only the lead bits of the last transmitted burst of a truncated packet are transmitted in such a way that they can be reliably received. In order to deal with this:

(1) The encoding of EOP must differ from the encoding of SOP and from all possible data burst codes in the bits that must be guaranteed to be received reliably if the burst is truncated or overwritten. Receivers must be able to distinguish the EOP on the basis of these bits alone. An example will be given below.

(2) A locomotive should be placed at the front of every packet train by a transmitter station that initiates the train. The locomotive is preferred to consist of a number of start-of-packet trains (SOPT) bursts. At least two SOPT bursts should be used in order that one may be corrupted by a T-collision, while the other one remains uncorrupted. A station initiating a packet train should first transmit several SOPT bursts, then immediately should send the first payload packet of the packet train, if it has one to transmit. Part of the first SOPT will be consumed if the packet train collides with a transmitting station downstream.

The encoding of SOPT, EOP and SOP should be established to:

(1) Ensure that the receiver is able to distinguish an EOP from any other burst by inspecting the portion of a burst guaranteed not to be overlapped by an upstream transmission.

(2) Ensure that a T-collision does not create an end flag (an EOP).

(3) Ensure that the downstream receiver can align on the second SOPT burst of the locomotive when the first SOPT burst in a locomotive from upstream overlaps the last burst transmitted from a downstream station during a T-collision.

In the encoding, to be able to distinguish an EOP from any other burst, the MRLP of the EOP should be encoded entirely in the part of the burst that can not be overlapped in a T-collision. Further, the maximum overlap permitted in T-collisions should always leave a leading portion long enough to contain an MRLP of the EOP.

All possible trailing portions following the corrupted collision overlapped portion that are less than the whole first SOPT burst of the signal from upstream must not have the appearance of the beginning of any burst whatsoever. This can be achieved by the receiver always consuming a whole burst, thus always consuming the leading portion and the overlapped portion of the collided bursts as a single burst. This leaves only the problem of ensuring that the trailing portion and the first part of the SOPT burst following it cannot be interpreted as the start of a burst.

The body of the SOPT burst and the burst stop field should be encoded so that no part of it appears to be a burst start field.

An acceptable encoding for the above, using an ASK modulation scheme, has the burst start field represented by two bits, the burst stop field represented by two 0 bits, and the body of the SOPT field encoded as all 0's.

The above encoding prevents the trailing portion following the corrupted overlapped portion resulting from the collision from being recognized as any burst whatsoever, except possibly a SOPT when the overlap is of almost no duration, since the receiver will not detect a burst start field anywhere in the trailing portion if either of the two start bits are consumed during the burst interval consisting of the leading portion and the overlapped portion.

If each of the delay elements 8A–8N is $$D=s+2b+T_d$$

then the transmitter may continue transmitting for a period equal to $s+2b$ after detection of a transmission at the S lead before it begins to overwrite the transmission received from upstream. This ensures that at least two bits of the burst information field of the last transmitted burst of a truncated packet are transmitted correctly.

Figure 5:
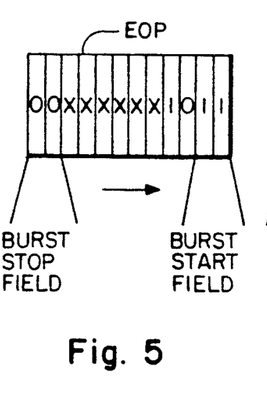
FIGS. 5, 6 and 7 represent data bursts for end of packet, start of packet, and data respectively.
Figure 6:
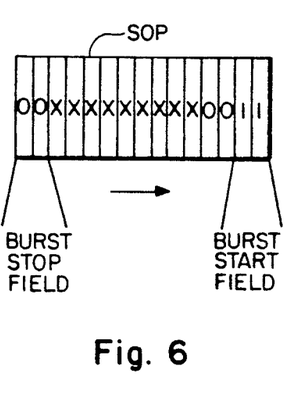
Figure 7:
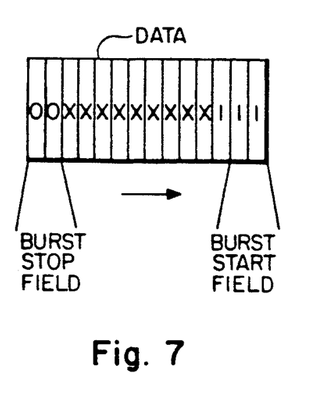

FIGS. 5, 6 and 7 illustrate burst structures suitable for use in the last-described embodiment. The first bit following the burst start field in each is a burst control field which distinguishes data bursts from control bursts, such as EOP, SOP and SOPT. The value of the burst control field designating a control burst must be 0 in order to be consistent with the encoding described above for the SOPT (all zeros except for the burst start field). Thus for EOP, the second bit following the burst start field must be 1 to distinguish the EOP from all control bursts, including SOPT, which has a 0 in this position. Thus FIG. 5 illustrates an EOP burst format, FIG. 6 illustrates an SOP and other control burst format, and FIG. 7 illustrates a data burst format. The bit positions containing X's are arbitrary, except that in SOP some must be 1's to distinguish SOP from SOPT.

ELIMINATION OF GAPS WITH SSBMT

The ASK encoding of bursts described above has a feature in that a trailing portion of a burst may be encoded by an absence of transmitted energy. The trailing portion of the burst thus encoded is of variable length. In the ASK encoding, the stop bits, and zeros present in the burst information field, are encoded as an absence of transmitted energy. The earlier methods given for the control of gaps and overwriting are modified to deal with such encodings. A method to append packets to an SSBMT packet train with these kinds of encodings is presented below. The method leaves an average gap of zero duration between the packets of a packet train.

In order to eliminate gaps, the commencement of transmission at the T lead must occur just when the trailing edge of the last stop bit of the last burst of the packet train to which the transmission is to be appended passes the T lead. A packet transmission which starts earlier may overwrite and corrupt the last burst of the packet train, but also corrupt the first burst of the packet being transmitted. A transmission which starts later will leave a gap in the packet train.

Figure 9:
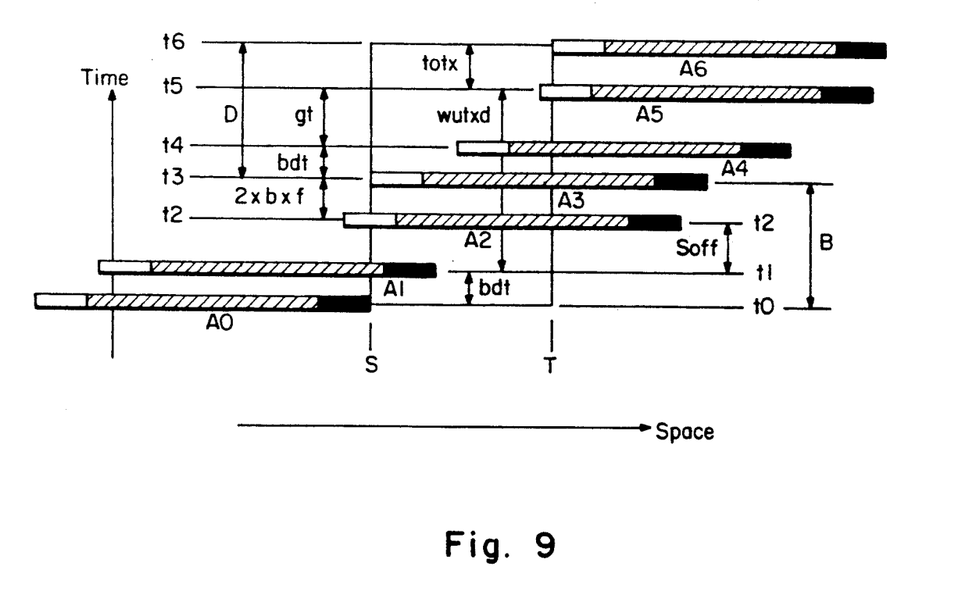
FIG. 9 is an illustration of a burst at a station at several instants in time.

FIG. 9 is used to illustrate the appending of a packet to a packet train according to this invention. In FIG. 9, a single burst of a packet train is shown in seven positions A0–A6 relative to the S and T leads (shown as S and T) of a station which has traffic to append to the packet train. The start bits of the burst are shown most heavily shaded, the burst information field is shown intermediately shaded, and the burst stop bits are shown unshaded. The seven burst positions are numbered from A0 to A6, in order of increasing time. The burst occupies the first burst position, burst position numbered A0, at time t0, and occupies the Nth burst position at time tN.

The following additional symbols used in FIG. 9 are defined below:

1. bdt (burst detection time) The elapsed time that is required for the S lead and its associated circuits to detect the arrival of two consecutive one bits that follow some zeros. The S lead is turned on while it is known or suspected that there is no energy on the medium at the S lead. In this context, "turned on" means the S lead and associated circuits are configured to detect two consecutive 1 bits and indicate their presence. Under these conditions, the S lead will indicate the presence of two consecutive 1 bits an interval bdt after the leading edge of the first 1 bit arrives at the S lead. Thus bdt is the interval required to integrate the energy in two consecutive 1 bits, test a threshold, and provide an indication of their presence.

2. Soff (time S is turned off) When the S lead indicates the presence of two consecutive 1 bits while turned on, the S lead is then immediately turned off. In this context, "turned off" means the S lead and some associated circuit are configured to ignore the presence of consecutive 1 bits on the medium of the S lead. When two consecutive 1 bits are detected at the S lead, the S lead is turned off immediately, and remains turned off for an interval Soff. At the end of the interval Soff, the S lead is turned on again. The duration of Soff is such that the detection of the two start bits of a burst will result in the S lead being turned off until the stop bits of the same burst are passing the S lead, and a fraction f of the two stop bits remains to pass the S lead. Turning off the S lead in this way permits the transmitter to avoid interpreting the bits of the burst information field as start bits. Turning the S lead on before the stop bits have completely passed the S lead introduces some tolerance for the following burst being a little early due to small variations in, for example, the value of bdt between stations.

3. totx (time to turn on transmitter) Assume that the transmitter has an internal item of state information that indicates whether the transmitter is to transmit the first burst of a packet. The interval totx is the time required for the transmitter, after being triggered to do so, to inspect the status of the state information, for the transmitter to decide whether to transmit based on the value of the state information, and for the leading edge of the first start bit of the first burst to reach the place where the T lead joins the transmission medium.

4. wutxd (wait until transmission decision) When the transmitter receives an indication from the S lead that a pair of start bits have been received, it immediately starts a timer of duration wutxd. Expiration of the timer triggers the transmitter to transmit.

5. gt (gap tolerance) The interval qt is the maximum duration of a gap between bursts of a packet train that will not be interpreted by the transmitter as an end of packet train.

Consider now the seven positions of a burst passing the S and T leads of a station having traffic to transmit, shown relative to the positions of the S and T leads in FIG. 9.

Time t0: At t0 the leading edge of the first start bit of the burst has arrived at the S lead.

Time t1: At t1 the S lead indicates the presence of the start bits. In response to this event, the transmitter turns off the S lead, and starts timers of duration wutxd and Soff. Note that the start bits have gone a little past the S lead. Note also that t1 = t0 + bdt.

Time t2: At t2 timer Soff expires. The whole burst information field has passed the S lead, as well as a part of the stop bits. A fraction f of the two stop bits remains to propagate past the S lead, and will require time 2(f·b) to do so. In response to the expiry of the Soff timer, the transmitter turns on the S lead to detect the start bits of a following burst. f > 0 permits detection of a following burst that arrives a little earlier than the end of the stop bits of this burst.

Time t3: At t3 the trailing edge of the last stop bit of the burst has just arrived at the S lead. Note that t6 − t3 = D, since D is the period required for any point of a burst to propagate from S to T, and the tail of the burst is at S at t3 and at T at t6. Note also that t3 − t0 = B, since B is the time required for a burst to propagate past a fixed point of the medium, and the burst propagates past S in the interval from t0 to t3.

Time t4: At t4 bdt has elapsed since the tail of the burst was at the S lead. This is just sufficient time to detect the start bits of a following burst if it is perfectly lined up, with the leading edge of its first start bit on the trailing edge of the stop bits of this burst.

Time t5: At t5 the timer wutxd expires, provided that the S lead did not detect a following burst in the interval from t2 to t5. Expiration of wutxd triggers the transmitter to transmit. t5 must be later than t4. When a pair of start bits (a following burst) is detected in the interval t2 to t5, the transmitter performs the same actions as at t1, and returns to the same state it had just after t1. If no following burst is detected by the S lead in the interval t2 to t5, an end of packet train has been detected and wutxd will expire causing the transmitter to transmit, with the first start bit of the transmission reaching the bus at the T lead totx later. The amount by which t5 is later than t4 is known as gt, the gap tolerance, because a gap between bursts shorter than qt will not be detected by the station as the end of a packet train. gt > 0 allows for variation in, or example, bdt between stations. Since t6 − t3 = D, gt = D − bdt − totx, gt is determined by D, but must be greater than zero. This means that D > bdt + totx. D, of course, must also be greater than or equal to the delay required to protect the MRLP of the EOP.

Time t6: At t6 the trailing edge of the last stop bit of the burst has just arrived at the T lead. If the transmitter has decided in the interval totx to transmit, the leading edge of the first start bit of the transmission is also just arriving at the T lead. In practice, variations in the values of bdt, wutxd, and totx between stations means that the two bursts may overlap slightly, or be separated slightly, but, as indicated above, the fraction f accommodates a slight overlap, and gt > 0 accommodates separations (gaps).

At high speeds, it may be impossible to abort and restart the timer wutxd as fast as necessary. In this case, a pair of wutxd timers may be provided, each member of the pair being used (being effective) on alternating bursts. The wutxd timer designated as effective is changed each time that the start bits of a burst are detected, i.e. at t1, or in the interval between t2 and t5. When a timer expires, the actions associated with its expiry in the description above are performed only when it is effective.

The invention described above thus provides a transmission system having an extremely high reliability of data integrity useful in very high speed applications in which data packet collisions are expected. It is not limited to use on a local data bus, but can be used on other suitable transmission media.

A person understanding the present invention may conceive of other embodiments or variations without departing from the sphere and scope thereof as defined in the claims appended hereto.

We claim:

1. A data communication system comprising a plurality of data stations and a unidirectional bus having segments connected to and between said stations, each of the stations being connected to an upstream segment by a sense (S) lead and to a downstream segment by a transmit (T) lead, each station being adapted to sense energy via its S lead arriving on an associated upstream segment of the bus and including transmitting means for transmitting data signals via its T lead on an associated downstream segment of the bus, signal delay elements interconnecting upstream and downstream segments of the bus bypassing each of the stations, the time delay of each of the signal delay elements being a function of the total interval of a predetermined group of data signal bit durations of said data signals added to a period $T_d$ which is equal to the time between arrival of energy at an S lead and the instant when an associated transmitting means can, in response to such detection, stop transmitting energy on its T lead.

2. A data communication system as defined in claim 1, in which the data signals are in the form of packets, each being comprised of at least a start flag and an end flag, each end flag containing a minimum recognizable leading portion (MRLP) comprised of predetermined bits extending over a predetermined interval $T_{MRLP}$, wherein $D \geq T_{MRLP} + T_d$.

3. A data communication system as defined in claim 1, in which the data signals are in the form of packets, each packet being formed into bursts of data, each burst formed of a similar fixed number of bits and having a predetermined burst duration B, each burst being comprised of at least a burst start field, followed by a data field and followed by a burst stop field, wherein the duration of the burst start field is s and each single bit duration is b, wherein $D = s + 2b + T_d$.

4. A data communication system as defined in claim 1, in which the data signals are in the form of packets, each packet being formed into bursts of data formed of a similar number of bits and having a predetermined burst duration B, each burst being comprised of at least a burst start field, followed by a control field, followed by a data field, followed by a burst stop field, wherein the duration of the burst start field is s and each single bit duration is b, wherein $D = s + T_d + Nb$, where N is the number of bits in the control field.

5. A data communication system as defined in claim 2, including means in each station for detecting the absence of energy from an associated upstream segment of the bus while transmitting a packet of data signals immediately prior to transmission of an end flag of said packet of data signals, and means at each station for transmitting at least the MRLP of the end flag and no more than the end flag upon detection of said absence of said energy and for suppressing transmission of the end flag upon detection of the presence of said energy.

6. A data communication system as defined in claim 5, in which the MRLP of the end flag is the entire end flag.

7. A data communication system as defined in claim 5, including means at each station for transmitting a duplicate of the packet having had its end flag suppressed.

8. A data communication system as defined in claim 7, including receiving means connected to the bus downstream of all of the transmitting means, each of the receiving means being comprised of means for detecting the absence of an end flag, in the event of receiving a second packet start flag after receiving a first packet start flag and no packet end flag therebetween.

9. A data communication system as defined in claim 8, in which the receiving means includes means for detecting a missing end flag in the event of detection of a quiescent period on the bus after receiving a packet start flag in a packet which is in a train of packets, which quiescent period is significantly longer than a predetermined period between packets in a sequence of packets.

10. A data communication system as defined in claim 8, in which each transmitting means is adapted to transmit data signals on a downstream segment of the bus to which it is connected in a sequence of packets following the termination of the detection of the absence of energy via its S lead to form a packet train containing data packets from an upstream segment of the bus followed by data packets from said transmitting means, and to transmit said duplicate packet at a later time, each receiving means including means for discarding a packet which has been detected as having an end flag missing.

11. A data communication system as defined in claim 1 including means in each transmitting means for delaying commencement of transmission of data signals after detecting the absence of energy via its S lead for a period $T_{tc} = D - T_{deot}$, wherein $T_{deot}$ is the time required to detect disappearance of a signal passing an S lead, whereby time gaps between packets of a packet train are substantially eliminated.

12. A data communication system as defined in claim 4, the transmitting means including means for transmitting the packets in trains of packets having a predetermined minimum time interval between each train, a time interval between each burst being less than said minimum time interval between each train of packets.

13. A data communication system as defined in claim 3, in which trains of packets are preceded by a locomotive signal generated by a transmitting means initiating transmission of a train of packets, the locomotive signal, and the EOP and the SOP signals each being encoded so that a data burst, or any control burst except EOP can be distinguished from an EOP burst when subjected to collision of a locomotive with an EOP permitting the EOP to be recognized as an EOP by receivers.

14. A data communication system as defined in claim 1, in which the data signals are in the form of packets, each packet being formed into bursts of data, each packet being comprised of an end flag and a start flag, the end flag being no longer than the length of a burst, each burst formed of a similar fixed number of bits and having a predetermined burst duration B, each burst being comprised of at least a burst start field, followed by a data field and followed by a burst stop field.

15. A data communication system as defined in claim 14, in which each packet contains an information field between the start flag and end flag, the beginning of an end flag being aligned with a burst immediately following the information field.

16. A data communication system as defined in claim 15 including means in said stations for completing transmission of a portion of a burst of data for a period at least equal to $T_{MRLP}$ in the event of detection of energy from upstream at an S lead during transmission thereof, and for suppressing transmission of an immediately following burst of data.

17. A data communication system as defined in claim 16, including means in said stations for retransmitting a packet that has been transmitted with no end flag.

18. A data communication system as defined in claim 1 including means in each station for delaying commencement of transmission of data signals after detecting the absence of energy via its S lead for a period $T_{tc} = D - T_{deot} + g$, wherein g is a time gap introduced by each transmitting means between packets of a packet train, $T_{deot}$ is the time required to detect disappearance of a signal passing an S lead, whereby any overlap between packets of a packet train are substantially eliminated.

19. A data communication system as defined in claim 1 including means in each station for delaying commencement of transmission of data signals after detecting the absence of energy via its S lead for a period $T_{tc} = D - T_{deot} - ovwd$, where ovwd is an interval of overlap time introduced by each transmitting means by which a packet overwrites the end of a packet train to which it is being appended, and $T_{deot}$ is the time required to detect disappearance of a signal passing an S lead, the end of the packet train to which the packet is to be appended comprising a destructible end portion and the beginning of the packet to be appended comprising a destructible preamble portion, each destructible portion having a length at least as long as ovwd, whereby time gaps between packets of the packet train are eliminated.

20. A data communication system as defined in claim 14 in which the data is transmitted using amplitude shift key modulation, the burst start field being comprised of two 1 bits.

21. A data communication system as defined in claim 20 in which the burst stop field is comprised of two 0 bits.

22. A data communication system as defined in claim 15 in which the burst information field values of the start flag and end flag differ from each other and from all information fields.

23. A data communication system as defined in claim 22 in which the bursts of the start and end flags have at least one more bit than the bursts of the information fields.

24. A data communication system as defined in claim 12 in which the time gap between each of the bursts of a packet are less than the time gaps between trains of packets.

25. A data communication system as defined in claim 1, in which the data signals are in the form of packets, each packet being formed into bursts of data, each burst formed of a similar fixed number of bits and having a predetermined burst duration B, each burst being comprised of at least a burst start field, followed by a data field and followed by a burst stop field, wherein the duration of the burst start field is s and each single bit duration is b, wherein $D \leq B + T_d$, including means in said stations for completing transmission of a portion of a block of data for a period at least equal to TMRLP in the event of detection of energy from upstream at an S lead during transmission thereof, and for suppressing transmission of an immediately following block of data.

26. A data communication system as defined in claim 15, in which the transmitter transmits using amplitude shift key modulation and start-stop block mode transmission, including means for detecting at the S leads of said stations the presence of two consecutive 1 bits of a burst, then ignoring the presence of following consecutive 1 bits for an interval extending until after stop bits of the same burst pass the detecting lead less a predetermined tolerance interval.

27. A data communication system as defined in claim 26, including means for delaying transmission by the transmitter following detection of two consecutive 1 bits of a burst of a predetermined level.

28. A data communication system as defined in claim 2, in which the time delay $D > bdt + totx$, wherein bdt is the time required for the detection of the arrival of two consecutive 1 bits that follow some zeros at the S lead, and totx is the time required for the transmitter, after being enabled to do so, to decide whether to transmit added to the time required for a leading edge of a first bit of a first burst to be transmitted by the transmitter to reach the junction point of its T lead and the bus.

* * * * *